United States Patent
Loladia et al.

(10) Patent No.: US 10,382,203 B1
(45) Date of Patent: Aug. 13, 2019

(54) ASSOCIATING APPLICATIONS WITH INTERNET-OF-THINGS (IOT) DEVICES USING THREE-WAY HANDSHAKE

(71) Applicant: Amazon Technologies, Inc., Seattle, WA (US)

(72) Inventors: Rameez Loladia, Seattle, WA (US); Ashutosh Thakur, Seattle, WA (US); Julian Embry Herwitz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/359,506

(22) Filed: Nov. 22, 2016

(51) Int. Cl.
| | |
|---|---|
| *H04L 29/06* | (2006.01) |
| *H04L 9/32* | (2006.01) |
| *H04L 29/08* | (2006.01) |
| *H04L 9/14* | (2006.01) |
| *H04L 9/30* | (2006.01) |
| *H04W 12/06* | (2009.01) |
| *H04W 12/04* | (2009.01) |

(52) U.S. Cl.
CPC .............. *H04L 9/3226* (2013.01); *H04L 9/14* (2013.01); *H04L 9/30* (2013.01); *H04L 63/06* (2013.01); *H04L 63/083* (2013.01); *H04L 67/12* (2013.01); *H04W 12/04* (2013.01); *H04W 12/06* (2013.01)

(58) Field of Classification Search
CPC ......... H04L 9/3226; H04L 63/06; H04L 9/14; H04L 63/083; H04L 67/12; H04L 9/30; H04W 12/04; H04W 12/06
See application file for complete search history.

(56) References Cited

U.S. PATENT DOCUMENTS

| | | | | |
|---|---|---|---|---|
| 6,978,373 | B1* | 12/2005 | Hild | H04L 29/06 380/270 |
| 8,051,469 | B2* | 11/2011 | Shewchuk | H04L 9/3271 726/5 |
| 8,239,927 | B2* | 8/2012 | Benaloh | H04L 9/3213 713/150 |
| 8,447,983 | B1* | 5/2013 | Beck | H04L 9/0894 705/65 |
| 8,539,567 | B1* | 9/2013 | Logue | H04L 63/0884 726/7 |
| 9,100,497 | B2* | 8/2015 | Preiss | H04M 1/72563 |
| 9,124,582 | B2* | 9/2015 | Kalinichenko | G06F 21/43 |
| 9,231,942 | B1* | 1/2016 | Pinkerton | H04L 63/107 |
| 9,338,130 | B2* | 5/2016 | Von Huben | H04L 61/35 |

(Continued)

*Primary Examiner* — David Garcia Cervetti
(74) *Attorney, Agent, or Firm* — Patterson + Sheridan, LLP

(57) ABSTRACT

A three-way pairing handshake may include an internet-of-things (IoT) service sending an encrypted token to an IoT device in response to a request for a token from that IoT device. The encrypted token may store a service managed client identifier and a device identifier. The IoT device may share the encrypted token with a companion application on a mobile device. In turn, the companion application sends a pairing request to the IoT service which includes the encrypted token, along with a copy of the device identifier and the client identifier. The IoT service may validate the pairing request by decrypting the encrypted token included in the pairing request and verifying that the device identifier and the client identifier recovered from the decrypted token matches the device identifier and client identifier received in the pairing request.

20 Claims, 9 Drawing Sheets

(56) References Cited

U.S. PATENT DOCUMENTS

| | | | | |
|---|---|---|---|---|
| 9,407,624 B1* | 8/2016 | Myers | | H04L 63/08 |
| 9,451,573 B2* | 9/2016 | Erickson | | H04W 76/10 |
| 9,854,384 B2* | 12/2017 | Zhang | | H04H 20/61 |
| 9,882,894 B2* | 1/2018 | Yin | | H04L 63/083 |
| 9,936,383 B2* | 4/2018 | Ramachandran | | H04W 4/70 |
| 9,942,223 B2* | 4/2018 | Vincent | | G06Q 10/1095 |
| 2006/0064588 A1* | 3/2006 | Tidwell | | G06F 21/316 |
| | | | | 713/169 |
| 2007/0132550 A1* | 6/2007 | Avraham | | E05B 37/08 |
| | | | | 340/5.21 |
| 2011/0179478 A1* | 7/2011 | Flick | | H04L 9/0822 |
| | | | | 726/9 |
| 2011/0283111 A1* | 11/2011 | Bister | | G06F 21/10 |
| | | | | 713/185 |
| 2012/0106738 A1* | 5/2012 | Belenkiy | | H04L 9/0872 |
| | | | | 380/270 |
| 2013/0145140 A1* | 6/2013 | Hsien | | G06F 21/575 |
| | | | | 713/2 |
| 2014/0281553 A1* | 9/2014 | Illion | | H04L 51/28 |
| | | | | 713/173 |
| 2015/0006870 A1* | 1/2015 | Switzer | | G06F 9/4401 |
| | | | | 713/1 |
| 2015/0143125 A1* | 5/2015 | Nix | | H04W 4/70 |
| | | | | 713/171 |
| 2015/0269566 A1* | 9/2015 | Gaddam | | G06Q 20/385 |
| | | | | 705/67 |
| 2015/0381618 A1* | 12/2015 | Lin | | H04L 63/0869 |
| | | | | 713/169 |
| 2016/0094664 A1* | 3/2016 | Olcese | | H04L 67/142 |
| | | | | 709/225 |
| 2016/0164680 A1* | 6/2016 | Liao | | H04W 12/04 |
| | | | | 713/155 |
| 2016/0171479 A1* | 6/2016 | Prakash | | H04W 4/70 |
| | | | | 705/44 |
| 2016/0212137 A1* | 7/2016 | Pottier | | H04L 63/101 |
| 2016/0241402 A1* | 8/2016 | Gordon | | H04L 9/3228 |
| 2016/0253651 A1* | 9/2016 | Park | | G07F 9/023 |
| | | | | 705/39 |
| 2016/0253664 A1* | 9/2016 | Yuan | | G06F 21/445 |
| | | | | 705/71 |
| 2016/0277439 A1* | 9/2016 | Rotter | | H04L 63/0861 |
| 2016/0285628 A1* | 9/2016 | Carrer | | H04L 9/3228 |
| 2016/0323283 A1* | 11/2016 | Kang | | H04L 63/08 |
| 2016/0374133 A1* | 12/2016 | Logue | | H04W 8/005 |
| 2017/0006029 A1* | 1/2017 | Pedersen | | H04W 4/80 |
| 2017/0083909 A1* | 3/2017 | Mork | | G06Q 20/401 |
| 2017/0118218 A1* | 4/2017 | Koottayi | | H04L 63/101 |
| 2017/0118640 A1* | 4/2017 | Lee | | G06Q 20/40145 |
| 2017/0171187 A1* | 6/2017 | Yin | | H04L 63/083 |
| 2017/0231015 A1* | 8/2017 | Jang | | G08B 6/00 |
| 2017/0235964 A1* | 8/2017 | Beiter | | G06F 21/33 |
| | | | | 713/193 |
| 2017/0272240 A1* | 9/2017 | Bar-El | | H04L 9/0877 |
| 2017/0272419 A1* | 9/2017 | Kumar | | H04L 63/06 |
| 2017/0325089 A1* | 11/2017 | Sharma | | G06F 21/53 |
| 2017/0337542 A1* | 11/2017 | Kim | | G06F 3/041 |
| 2018/0020001 A1* | 1/2018 | White | | H04L 63/10 |
| 2018/0026963 A1* | 1/2018 | Ning | | H04L 63/0428 |
| 2018/0033013 A1* | 2/2018 | Park | | G06Q 20/325 |
| 2018/0041487 A1* | 2/2018 | Wang | | H04L 61/6059 |
| 2018/0116004 A1* | 4/2018 | Britt | | H04W 40/125 |
| 2018/0295133 A1* | 10/2018 | Xu | | H04L 29/08 |

* cited by examiner

ASSOCIATING APPLICATIONS WITH INTERNET-OF-THINGS (IOT) DEVICES USING THREE-WAY HANDSHAKE

BACKGROUND

Embodiments presented herein generally relate to managing large numbers of interconnected network devices—often referred to as Internet of Things (IoT) devices. More specifically, embodiments presented herein provide techniques for pairing a given IoT device with software applications using a three-way handshake between the IoT device, a mobile device application, and applications on a cloud computing platform.

The "Internet-of-things" (IoT) generally refers to the internetworking of physical devices, vehicles, buildings, and other things with software and computing systems. IoT devices include virtually any device that can be fitted with electronics, software, sensors, actuators, and the like—enabling such devices to collect and exchange data with software applications. For instance, common household appliances may include components that gather and share data with software applications over a network or that allow the device to be monitored and controlled remotely. Other consumer examples include network-connected thermostats, light bulbs, power switches, etc. As an example, an IoT-based thermostat can collect data relating to the schedule of and usage of an HVAC system to program itself based the collected data. As another example, a door lock may be locked, unlocked, or monitored as being locked or unlocked, using sensors on the lock, an actuator, and networking components which exchange sensor data about lock state with other applications. In enterprise contexts, IoT devices can be deployed to a variety of manufacturing, supply chain, and industrial environments.

IoT devices are typically networked via a hub that sends and receives messages between the hub and individual devices, e.g., a hub that communicates with and controls a set of light bulbs throughout a home or business. Such messages can include data received from a device, commands to perform by the device, executable code stored on the device, data sent from one device to another, and the like. Although the hub can be a physical networking device, cloud computing platforms can provide a hub service for IoT devices. Doing so allows a set of IoT devices to connect directly to the cloud and use other services provided by the cloud computing platform, such as storage, big-data analytics, and data stream processing. Indeed, many IoT devices are manufactured to support cloud-based IoT hub subsystems. Further, software applications used to control an IoT device can interact with both a cloud-based hub service and other applications in order to monitor and control a collection of IoT devices.

One issue regarding IoT devices, particularly for large deployments, is pairing each individual device with supporting software applications, and in the case of a cloud-based service provider associating each such IoT device with a service managed user or client identity. That is, an IoT device needs to be paired software applications used to control that devices e.g. to turn on a vacuum cleaner or report the temperature of a home. However, doing so typically requires that the IoT device and applications authorize each other as trusted parties. Generally, the pairing process should allow IoT device manufacturers to develop applications and end users to use these applications to connect to their devices. At the same time, only authorized parties should be able to connect and control an IoT device using the related software applications. Stated conversely, an unauthorized user should not be able to control an IoT device for which they do not have permissions to access. However, given that a device manufacturer may ship millions of IoT devices, it may be impractical for the device manufacturer to develop and maintain a cloud-based hub service that can both scale for millions of IoT devices and provide a pairing workflow and device command workflow that is based on individual user identities. That is, an IoT device provider may be reluctant to maintain a cloud-based hub service which maintains a mapping of what IoT devices are authorized for use by a given user and what permissions each such user has for a given IoT device pairing.

BRIEF DESCRIPTION OF DRAWINGS

Various embodiments in accordance with the present disclosure will be described with reference to the drawings, in which.

DETAILED DESCRIPTION

Figure 1:
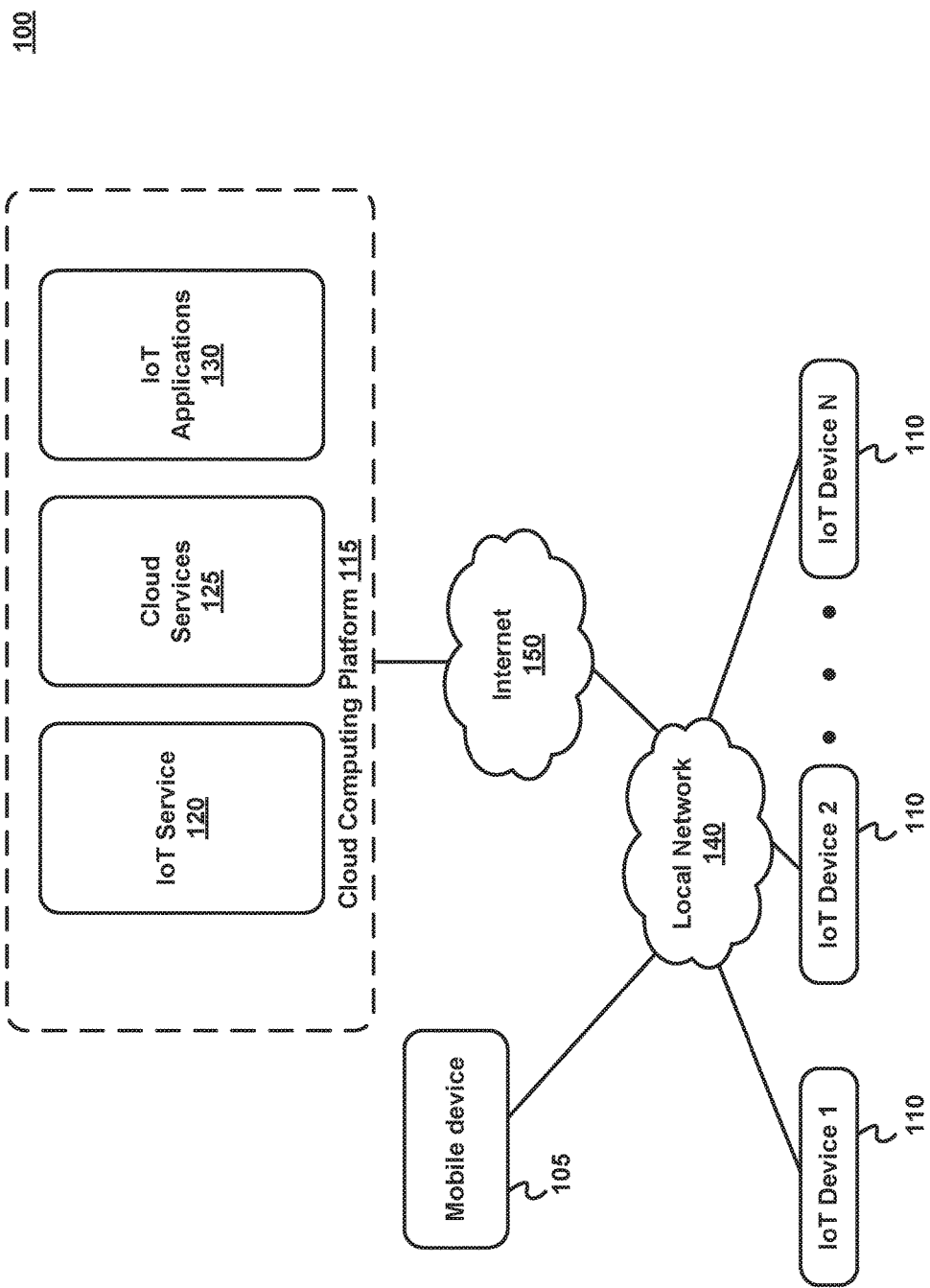
FIG. 1 illustrates an example cloud computing platform hosting an Internet of Things (IoT) service used to pair IoT devices with a service managed client ID and a companion application, according to one embodiment.

Generally, an Internet-of-things (IoT) device that supports cloud-based hub subsystems needs to be paired with a companion application, and frequently, with a cloud-based IoT service, before being put into general use. The companion application generally allows a user to monitor, control, and otherwise manage the IoT device. For example, a companion application could allow a user to control home lighting by turning lights on and off, setting lighting levels and colors, or compose rules used to control device behavior, e.g., a rule which turned on a porch light every day at sunset. In other cases, each IoT device associated with a given user could share sensor data with software applications hosted in the cloud. Before a companion application can control or access a given device, the application and IoT device typically need to perform a pairing or binding process in which the companion application is authorized to control the device and obtains device information needed to interact with the IoT device.

Further, a cloud-based hub service may also need to be paired with the IoT device. Pairing may generally require that the IoT device and companion application are able to discover the presence of one another. Further, the pairing may include the IoT service verifying a device identifier (device ID) associated with IoT device and a service managed user identity (client ID) in order to configure permissions regarding what the particular user may do with that IoT device. Note, a client ID may refer to both an individual user controlling a set of IoT devices using a companion application (such as an app on a mobile phone that controls home lighting and environmental systems), as well as an enterprise user where the client ID provides an identifier associated with the IoT devices deployed by the enterprise.

In one embodiment, a cloud based IoT service pairs a service-managed identifier (again, referred to as a "user ID" or client ID") with a companion application and IoT device by performing a three-way handshake in conjunction with the companion application and the IoT device. In one embodiment, a user initiates the three-way handshake process to pair an IoT device by authenticating themselves with the companion application using an external login provider, e.g., a third-party open authentication (oauth) service. For example, the user may provide credentials to the companion application on a mobile phone which requests an access token from the external login provider based on the credentials. Once the login service authenticates the credentials, the IoT service maps or issues a service-managed identifier (client ID) to the user. The client ID generally allows the IoT service to identify a given user across IoT devices paired with that client ID.

The companion application is then set to a pairing mode and begins listening for an IoT device to pair with over a first communication link. The IoT device is also set to a pairing mode. In a particular embodiment, the pairing mode may be established using a Bluetooth Low Energy (BLE) session connecting the IoT device and the mobile device (via the companion application) over a short-range wireless communication link. Once established, the companion application passes the client ID received from the IoT service to the IoT device over the first communication link. In turn, the IoT device sends a request for a token to the IoT service over a second communication connection link, e.g., by sending an http call or a mock HTTP request/response using MQTT pub/sub messages to the IoT service. In response, the IoT service generates and encrypts a token to send to the IoT device over the second communication link. Note, the keys used to encrypt/decrypt the token may be held privately by the IoT service—meaning that the companion application, IoT device, user, or device manufacturer cannot recover the contents of the encrypted token. The token itself may store an authorization code identifying a policy to apply to the IoT device, a timestamp indicating a validity period of the token, the device ID received from the IoT device, and the client ID first passed from the companion application to the IoT device and then from the IoT device to the IoT service as part of the token request.

The service sends the token to the IOT device, which passes the token and a device ID to the companion application over the first communication link (e.g., over the BLE session). In turn, the companion application sends a pairing request to the IoT service. The request may include a copy of the token and the device ID of the IoT device.

In one embodiment, the IoT service completes the pairing processes by decrypting the token received from the companion application and verifying that the contents match the token sent to the IoT device earlier in the pairing process. To do so, the IoT service validates the token by matching the authorization code in the copy of the token received from the companion application with the one in the token sent to the IoT device, matching the client ID of the companion application making the pairing request with the client ID recovered from the token, and verifying that the token is valid based on the timestamp. Assuming the token is valid, the IoT service may associate a device user policy with the device ID, allowing the companion application to interact with the (now paired) IoT device via a corresponding shadow instance of the IoT device managed by the IoT service.

Communications between the IoT service and the companion application or IoT device may occur using an encrypted channel (e.g., SSL/TLS). Further, if a third-party recovered the client ID sent they could request a token but would not be able to use the token from the application, as the client ID of the caller would not match the one in the token. Similarly, if a third-party obtained the token, they would be unable use the token from the application as the client ID of the caller would not match the one in the token.

Note, embodiments are described herein using IoT devices deployed in a residential home as reference example of an IoT device pairing with a cloud-based IoT service hub. Further, embodiments are described herein using certain standardized communication protocols, such as BLE, HTTP, HTTPS, SSL/TLS, MQTT, etc., to extract messages between interacting computing systems. However, one of skill in the art will recognize that embodiments of the invention may be adapted for use with a broad variety of IoT devices in residential and enterprise settings, as well as implemented using a broad variety of network communication protocols or standards.

FIG. 1 illustrates an example computing environment 100 which includes a cloud computing platform 115 hosting an Internet of Things (IoT) service 120 used to pair IoT devices 110 with a service managed client ID and a companion application, according to one embodiment. As shown, the computing environment 100 includes a mobile device 105 and IoT devices 110 connected to local network 140, e.g., a wireless network within a residential home. The network 140 includes an uplink with the internet 150, allowing mobile device 105 and IoT devices 110 to communicate with the cloud computing platform 115. In this example, the computing platform 115 includes an IoT service 120, cloud services 125 and IoT applications 130.

Generally, the cloud computing platform 115 makes a variety of cloud services 125 available to a user base. Cloud services 125 are included to be representative of a variety of scalable, on-demand computing resources and services available from a service provider hosting the cloud computing platform 115. For example, the cloud services 125 may include compute resource (e.g., virtual machine and container instances), database and storage services, network services, event driven computing services, message and queuing services, etc. In one embodiment, the manufacturer of IoT device 110 (or third-party developer) can use cloud services 125 to build, host, and deploy IoT applications 130. In turn, the IoT applications 130 can perform any appropriate computing task using data or services provided by or associated with IoT devices 110. The IoT application could be configured to use an event driven computing service to invoke computing actions in response to the state of a given IoT device or other triggering conditions, e.g., to turn on a porch light of a residential home at sunset each day.

The mobile device 105 is included to be representative of a variety of small computing platforms, such as mobile telephones and computing tablets. Of course, embodiments presented herein may be adapted to work with other computing systems, e.g., laptop and desktop computers. The companion application (or "app") could be implemented as a standalone application installed on mobile device 105, or other computing platform, as well as provided as an HTTP based application accessed using a web browser. The companion app generally provides a software application used to configure, interact with, and control IoT devices 110. In some cases, the companion app interacts with an IoT device 110 directly over local network 140 or using direct communication links (e.g., using Bluetooth and Bluetooth Low Energy (BLE) communication protocols). In other cases, the companion app could interact with the IoT device 110 indirectly by communicating with the IoT service 120. For example, the IoT service 120 could manage a virtual or "shadow" instance of each IoT device 110, which included the capabilities and last-known state of one of the IoT devices 110. State changes posted by the companion app to the IoT service result in changes to the state of the shadow. In turn, the IoT service 120 pushes such changes to the corresponding IoT device 110. The IoT service 120 also maintains permission data indicating what users (based on a client ID) have been authorized to control or interact with a given IoT device 110. More generally, the IoT service 120 provides a managed platform that allows connected IoT devices (e.g., IoT devices 110) to interact with the services provided by the cloud computing platform 115 (in addition to other entities).

In context of the present disclosure, a user may maintain any number of IoT devices 110. Each IoT device 110 generally represents a physical object configured to communicate with other systems and services (e.g., the mobile device 105, cloud computing platform 115, and other IoT devices 110) in addition to performing some underlying function associated with the IoT device 110 itself. For example, the IoT device 110 could be a household appliance or device configured with IoT components, such as a lightbulb or a thermostat. In one embodiment, the IoT device 110 communicates with other entities using messaging protocols, such as Message Queuing Telemetry Transport (MQTT). As known, MQTT provides a publish/subscribe messaging scheme that allows lightweight messaging between entities.

In one embodiment, however, each IoT device 110 needs to be paired with the companion app on the mobile device 105 and with a client ID used by the IoT service 120, prior to being controlled by the companion app on mobile device 105. To do so, the mobile device 105, IoT device 110, and IoT service 120 may perform a pairing workflow which pairs an IoT device 110 with the companion application on a mobile device 105 and a client ID managed by the IoT service 120 using a three-way handshake between the mobile device 105, IoT device 110, and IoT service 120. Examples of this pairing process are discussed in detail below.

Figure 2:
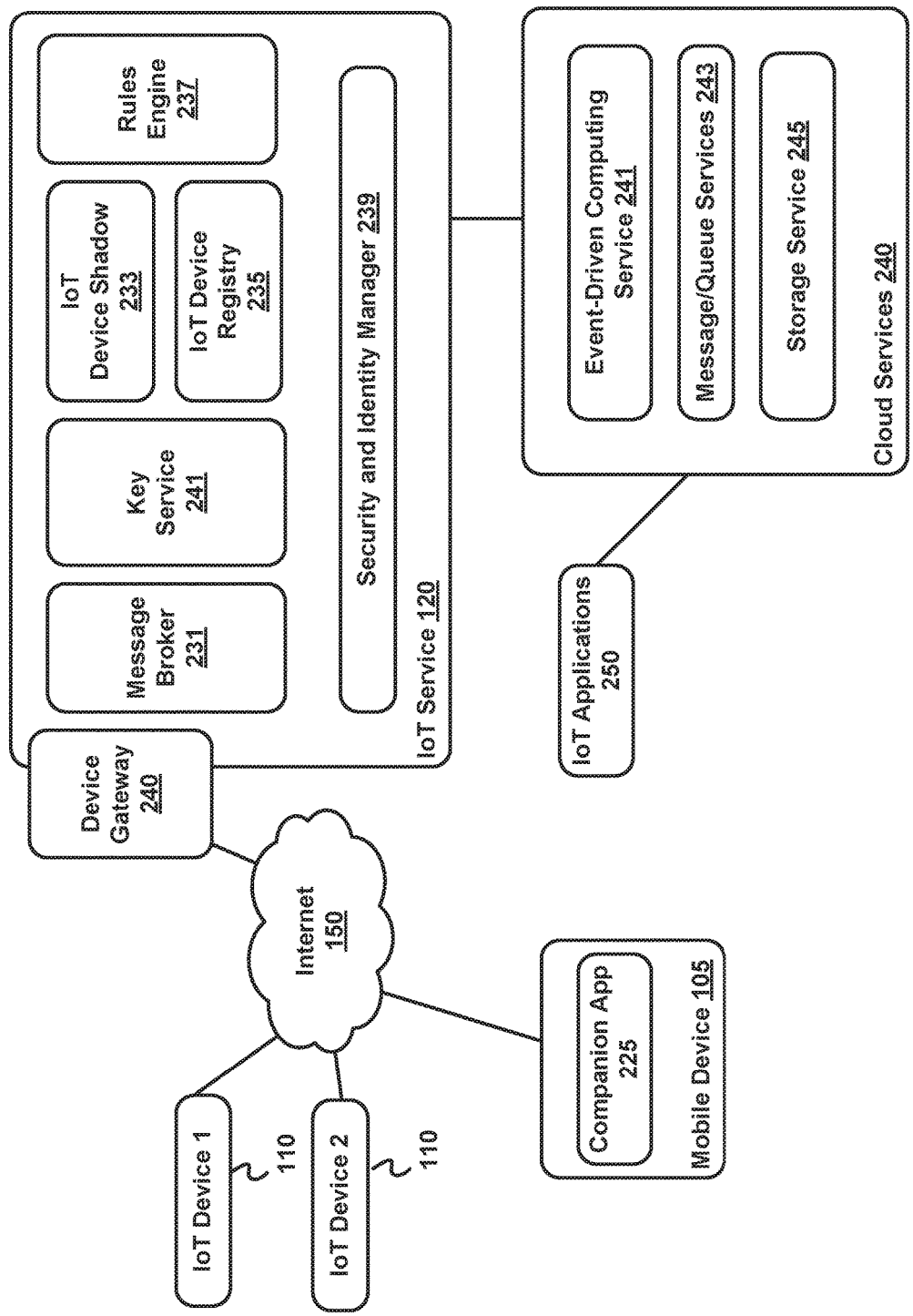
FIG. 2 illustrates IoT devices communicating with an IoT service on a cloud computing platform in order to pair IoT devices with companion applications on a mobile device, according to one embodiment.

FIG. 2 illustrates IoT devices 110 communicating with an IoT service 120 in order to pair IoT devices with a companion application 225 on a mobile device 105, according to one embodiment. As shown, the mobile device 105 includes companion app 225. As discussed above, companion app 225 may be configured to communicate and interact with IoT devices 110 and an IoT service 120 over a network 150 (e.g. the internet).

The IoT service 120 includes a device gateway 220, a message broker 231, IoT device shadows 233, IoT device registry 235, a rules engine 237, a security and identity manager 239, and a key service 240. The device gateway 230 generally provides a communication endpoint used by IoT devices 110 to securely and efficiently communicate with the IoT service 220. In one embodiment, the device gateway 230 exchanges messages using a publication/subscription model, allowing both one-to-one and one-to-many communications over, e.g., MQTT, WebSockets, or HTTP 1.1. Communication sessions established with the device gateway 230 may be protected from eavesdropping using secure communications protocols, such as secure sockets layer (SSL) or transport layer security (TLS). Further, before the device gateway 230 grants access to IoT service 120, a given IoT device 110 (or companion app 225) may need to authenticate itself using credentials such as a digital certificate (e.g., an X.509 certificate).

Once authenticated, a client (e.g., one of the IoT devices 110 or the companion app 225) can send messages to the device gateway 231 addressed to a topic, e.g., an MQTT message topic. The message broker 231, in turn, sends the message to each client registered to receive messages for that topic. For example, a given IoT device 110 may publish an MQTT message to a topic registered for the IoT device shadow 233 corresponding to that IoT device 110—identified using a device ID and a client ID. That is, the message may identify what device shadow should be updated and what client ID is associated with the message. The message sent by the IoT device 110 (or companion app 225) could, e.g., change metadata reflecting the state of that IoT device shadow 233. More generally, each IoT device shadow 233 may store a current state corresponding to one of the IoT devices 110 (e.g., as a JOSN formatted document). Companion app 225, as well as other IoT devices 110 and IoT applications 250, can read messages and interact with a given device 110 through the corresponding IoT device shadow 233. Each IoT device shadow 233 persists the last reported state of that device 110 and, when that device 110 is offline, a desired future state that IoT device 110.

The device registry 235 generally provides a device-identity service within the IoT service 120. The device registry 25 stores an identifier for each device 110 and tracks device metadata, such as the attributes and capabilities of each IoT device 110. The IoT device registry 235 may also store metadata describing the capabilities of a given IoT device 110. For example, metadata indicating that a given IoT sensor reports a temperature and whether the temperature is in is Fahrenheit or Celsius. Similarly, the IoT device registry 235 may identify what attributes are associated with a given IoT device 110. For example, for a light bulb, the registry 235 could store an attribute representing a power state of the light bulb. In turn, the IoT device shadows 233 correspond to instances of IoT device types that have paired with the IoT service. The device shadow may store a state value for each attribute, e.g., the last-known power state of a light bulb as being "on" or "off."

The rules engine 237 listens for incoming messages (e.g., MQTT messages) and compares messages received by the IoT service 120 to a set of rules. When a message matches a given rule, the rules engine 237 takes some action with the data in the message, as specified by the rule. For example the rules engine 237 could write data to storage service 245, invoke an event driven computing function on the computing service 241, send a message to the message/queue service 243, or access other services provided by the cloud services 125. For example, the event-driven computing service 241 may provide a computing service that invokes functions in response to triggering events independently from the underlying systems used to execute such functions. In the present context, the manufacturer of IoT device 110 could write a function invoked by the event-driven computing service 241 when an IoT device 110 requests data in a table maintained by the storage service 245. Similarly, the manufacturer of IoT device 110 could write a function invoked by the event-driven computing service 241 when an IoT device 110 sends analytical data for processing. In such a case, the function could post a message to the queue established using the message/queue services 243 indicating the presence of new information from an IoT device 110. In turn, the IoT application 250 could monitor and access new messages in such a queue.

The security and identity manager 239 provides a component which manages user identities and access rights within the IoT service 120. In one embodiment, the identity manager 239 may assign a distinct client identifier (client ID) to each entity registered with the IoT service 120. The client ID within the IoT service 120 may correspond to a user-identity authenticated by a third-party login service (e.g., an oauth service provided by social media services) when that user accesses the IOT service using the companion app 225. As noted, the IoT service 120 may use the client ID as service managed identity for an individual user as well as to represent IoT devices 110 scoped to an enterprise account.

In addition, a client ID may be associated with IoT devices 110 deployed by a user during an initial pairing process used to add new IoT devices 110 to the IoT computing envelopment. As noted, the pairing process pairs a new IoT device 110 being deployed with the companion app 225 on mobile device 105 and IoT service 120 using a three-way handshake between the mobile device 105, IoT device 110, and IoT service. In one embodiment, the pairing process includes the companion app 225 accessing the IoT service 120 using a set of access credentials (e.g., a user name and password or messages exchanged with a third-party login service). Once the user is authenticated, the IoT service 120 obtains a service managed identity (i.e., a client ID) from the security and identity manager 239 to associate with the user. As noted, the same client ID is shared across all IoT devices 110 paired with the service 120 for that user. As part of pairing a new IoT device 110, the IoT service 120 sends the client ID to the companion app 225 on the mobile device 105, which, in turn, shares the client ID with the IoT device 110 being paired over a local communication link (e.g., a BLE connection).

After receiving the user ID, the IoT device 110 sends a message to the device gateway 230 requesting a token. The token request message may include a device identifier (device ID) associated with the device 110 and the client ID received from the companion app 225. In turn, the IoT service 120 generates a token to send back to the IoT device. The token may include the device ID, user ID, a timestamp and an authorization code. In one embodiment, the IoT service 120 encrypts the token using a key provided by the key service 240. The particular key is generally known only to the IoT service 120. Further, the key service 240 may generate and store a distinct encryption key for each client ID, i.e., for each distinct user. Such encryption keys may have a relatively limited validity period (e.g., 24 hours). That is, the key service may generate a new encryption key used for pairing IoT device 110 with a given client ID at regular intervals.

Once the IoT service 120 encrypts a token, the pairing process continues by sending the encrypted token to the IoT device 110 (as a response to the token request message). The IoT device sends the token back to the companion app 225 over the local communication link. To complete the pairing process, the companion app 225 sends the copy of the encrypted token back to the device gateway 230, along with the client ID assigned to the companion app and the device ID of the IoT device 110. The IoT service 120 can decrypt the token and compare both the client ID and the device ID recovered from the token with the copies provided by the companion app 225 making the pairing request. Provided the client IDs and the device IDs match, the IoT service 120 binds the service managed identity of that user, i.e., the client ID, with the IoT device. Further, the IoT service 120 may create an IoT device shadow 233 to represent the newly paired IoT device 110 as well as create entries in the IOT device registry 235 for the newly paired IoT device 110. Further still, the IoT device 110 has shared a verified device ID with the companion app 105 and the companion app has shared a verified client ID with the IoT device 110.

Figure 3:
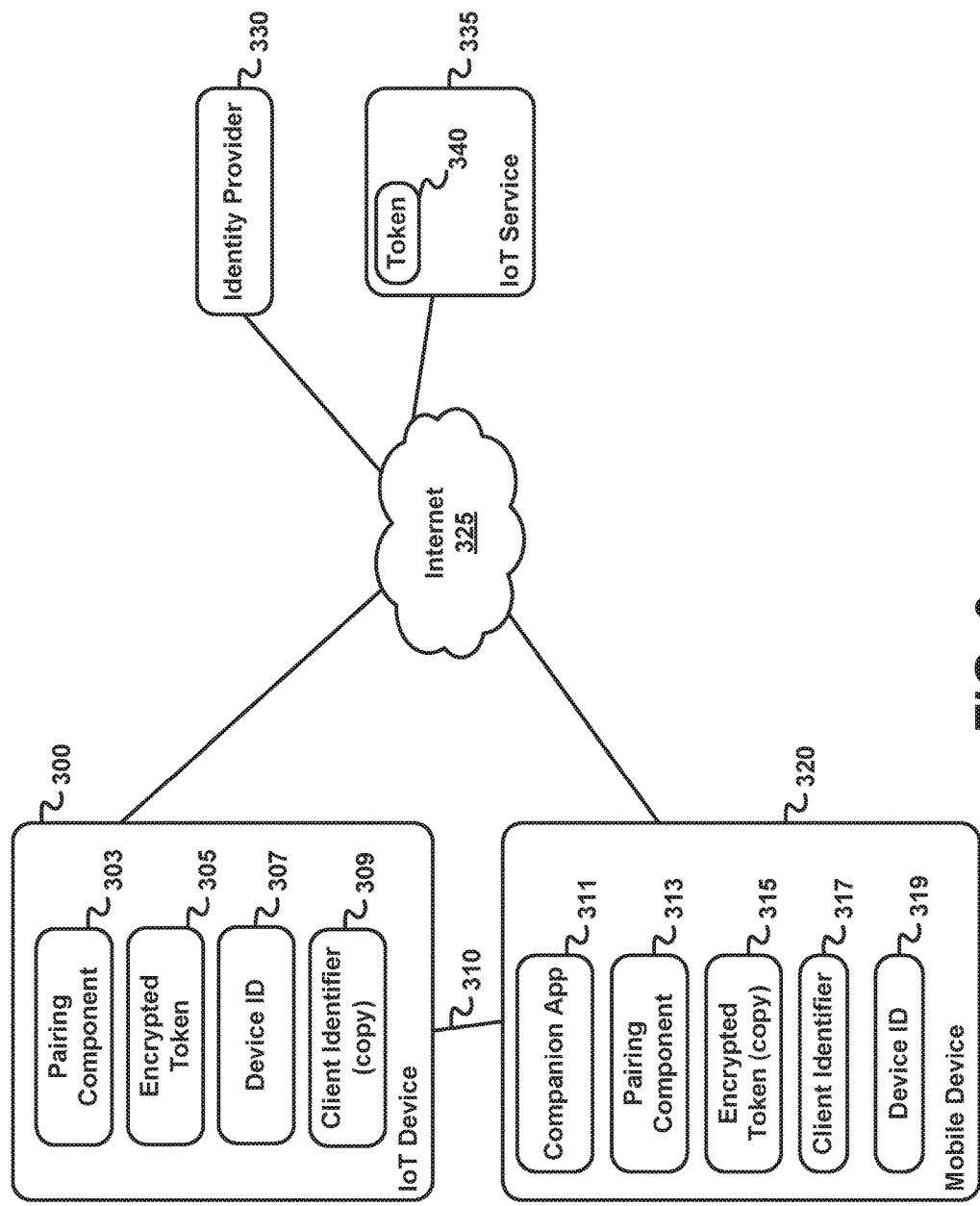
FIG. 3 illustrates components of an IoT device and mobile device interacting with an IoT service to pair the IoT device with the mobile device and IoT service using a three-way handshake, according to one embodiment.

FIG. 3 illustrates components of an IoT device 300 and mobile device 320 interacting with an IoT service 335 to pair IoT device 300 with the mobile device 320 and IoT service 225 using a three-way handshake, according to one embodiment. As shown, mobile device 320 includes a companion app 311, pairing component 313, a copy of an encrypted token 315, a service managed client identifier 317 (client ID), and a copy of a device identifier 319 (device ID).

In one embodiment, a user initiates the pairing process by authenticating their identity using the companion app 311 on the mobile device 300. For example, the user may provide a username and password (or other authentication credentials) to a third-party identity provider 330 via the companion app 311. For example, the IoT service 335 may allow users to authenticate themselves using credentials recognized by an open authentication (oauth) service provider trusted by the IoT service 335. Once the IoT service 335 authenticates a given user of companion app 311, the IoT service 335 may assign (or obtain a previously assigned) service managed identifier (i.e., client identifier 317) to represent that user across the IoT service 335 and IoT devices paired by that user. The IoT service 335 sends the client identifier 317 to the companion app 311 on the mobile device 320.

Once the client identifier 317 is received by the mobile device 320, the companion app 311 may initiate a local pairing process between the mobile device 320 and the IoT device 300. For example, a pairing component 313 on the mobile device 320 and a pairing component 303 on the IoT device may be activated to establish a local communication link 310 between the mobile device 320 and the IoT device 300. In one embodiment, the communication link 310 may be established using the Bluetooth low energy (BLE) communication protocol. The companion app 311 sends the client identifier 317 to the IoT device over communication link 310—represented in FIG. 3 as client identifier (copy) 309.

Figure 4:
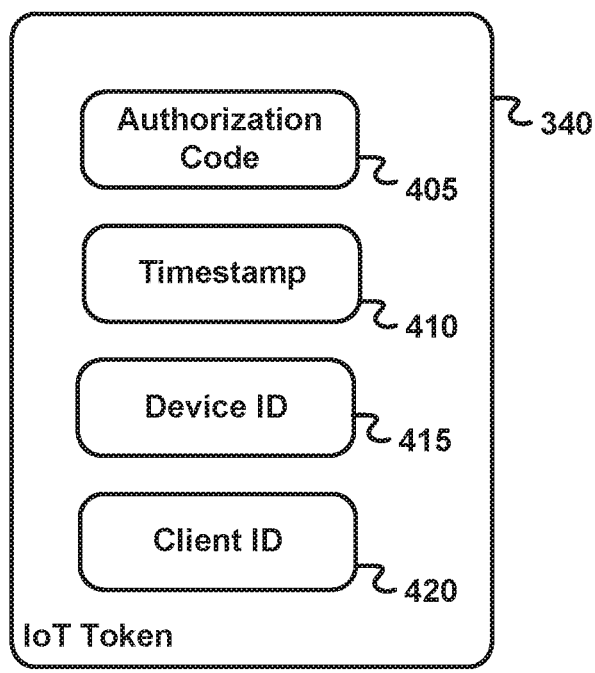
FIG. 4 illustrates an example token issued by an IoT service in order to associate an IoT service managed identity with an IoT device, according to one embodiment.

The IoT device 300 may continue the pairing process by sending a request for a token to the IoT service 335. In one embodiment, the token request includes a device identifier (device ID) 307 and the client identifier (copy) 309. After receiving the request, the IoT service 335 generates a token 340 to send back to the requesting IoT device 300. For example, FIG. 4 illustrates a token 340 generated by IoT service 335 in response to a token request received from IoT device 300 being paired with the companion app 311 and IoT service 335, according to one embodiment. As shown in FIG. 4, the token 340 includes a copy of both the client ID 420 and device ID 415, along with a timestamp 410 and an authorization code 405. As noted, the client ID 420 generally provides a service managed identifier used within the IoT service 335 to identify a given user and the device ID 415 provides an identifier used to identify a given IoT device 300.

The IoT service 335 may use the authorization code 410 to set authorization permissions for the user of companion app 311 on the IoT device 300. That is, the authorization code 415 may generally identify a policy indicating what actions a given user is authorized to perform relative to the IoT device 300. Timestamp 410 may indicate when the token 340 was first generated by the IoT service 335. In one embodiment, the timestamp 410 may be used to determine a current validity of the token 340. Referring again to FIG. 3, a pairing token 340 generated by the IoT service may have a short-lived validity period (e.g. a few minutes) as needed to complete the pairing process. Of course, the validity period of token 340 may be selected to suit the needs of an appropriate case. For example, once paired, the IoT device 300 could use the token 340 to prove the authenticity of additional messages sent to the device gateway of the IoT service 334. In such a case, the validity period could be substantially longer than needed for the pairing process.

In one embodiment, the IoT service 335 encrypts the token 340 generated in response to a token request received from IoT device 300. As noted, e.g., the service may encrypt token 340 using key or key material known only to the service 305—meaning the contents of encrypted token 305 are hidden from companion app 311 and IoT device 300. Stated conversely, only the IoT service 335 is expected to be able to decrypt encrypted token 305. In one embodiment, a key service may generate a distinct pairing key for each client ID, i.e., for each distinct service managed identifier managed by the IoT service e 335. Further, the key service may rotate the key associated with a given user on a periodic basis.

The IoT device 300 receives the encrypted token 305 from the IoT service 335. In turn, the IoT device 300 sends a copy of the encrypted token 305 to the companion app 311 on the mobile device—shown in FIG. 3 as encrypted token (copy) 315. The companion app 311 continues the pairing process by generating a pairing request sent to the IoT service 335. In one embodiment, the pairing request may include device ID 319 (representing IoT device 300), client ID 317 (representing the user of companion app 311), and encrypted token 315. Once received, the IoT service 335 can complete the pairing process by decrypting the encrypted token 315 and comparing the device ID recovered from the encrypted token 315 with the device ID 307 provided by the IOT device 319 in the token request. Further, the IoT service 335 may also compare the client ID 317 recovered from encrypted token 315 with the client ID expected by the IoT service 335, as well as confirm the token 315 remains valid based on the timestamp. Assuming information recovered from token 315 is successfully verified with token 340, the IoT service 335 attaches the policy referenced by the authorization code to the client ID 317, as reflected in the IoT device registry 235, and allows a companion app 311 acting under client ID 317 to interact with the now-paired IoT device 300 via an IoT device shadow 233 instantiated in the IoT service 335 following the pairing process.

Figure 5:
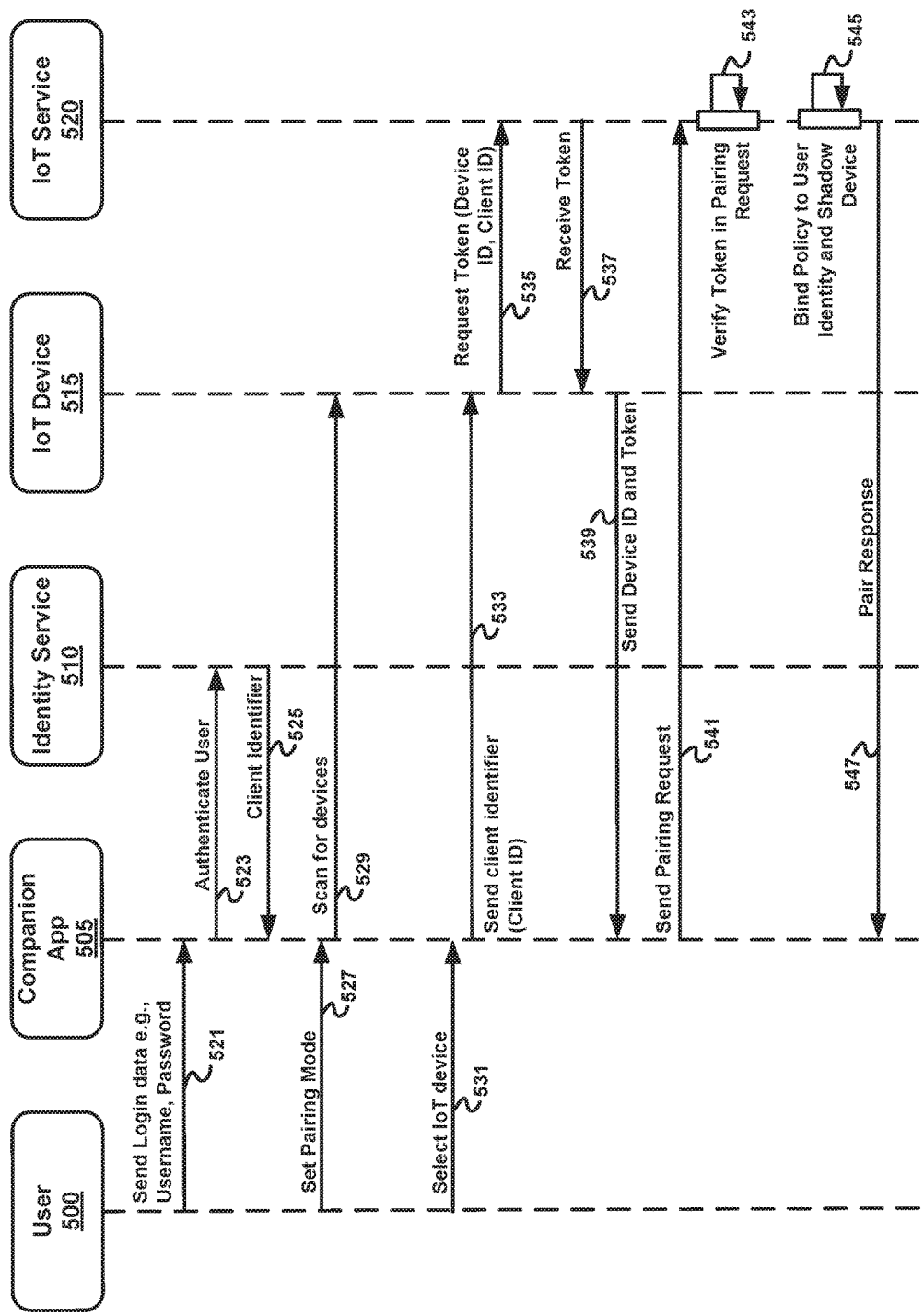
FIG. 5 illustrates an example sequence diagram of a 3-way handshake between a mobile device, and an IoT service performed to pair the IoT device with a companion application on the mobile device, according to one embodiment.

FIG. 5 illustrates the overall pairing workflow described above using a sequence diagram of a 3-way handshake between a mobile device, and an IoT service performed to pair the IoT device with a companion application on the mobile device, according to one embodiment. As shown, the workflow begins at 521 where a user 500 supplies login data, such as a username and password, to a companion app 505. The companion app 505 may provide the credentials to a third-party login service to obtain an access credential to present to the identify service 510. At 523, the companion app 505 authenticates itself to an identity service 510 with the access credential returned by the third-party login service. Provided the access credential from the third-party login service is authenticated, the identity service 510 may return a service managed identifier (client ID) recognized by the IoT service 520 (at 525). The client ID may generally identify a given user in scope to all IoT devices paired with the IoT service 520 under that user identity.

At 527, the user activates a pairing mode on the companion app 505 and mobile device. In one embodiment, the user also initiates a pairing mode on the IoT device 515. Once activated, the companion app 505 listens for a message from any IoT devices available to be paired with the companion app 505. For example, the IoT device 515 may respond to pairing beacon messages sent by the companion app 505. At 531, the user selects an IoT device to pair with the companion app 505 and establishes a first communication link to communicate directly with that IoT device (e.g., with IoT device 515). As noted, e.g., the companion app 550 and IoT device 515 may establish a Bluetooth low energy (BLE) connection. Once a pairing session is active, at 533, the companion app 505 sends the client ID received from the identity service 510 to the IoT device 515 over the communication link established for the pairing session. At 535, the IoT device 515 generates a token request message to send to the IoT service 515 over a second communication link (e.g., using an MQTT or HTTP message sent over a wireless network connection). In one embodiment, the request may include the client ID received over the first communication link and a device identifier (device ID) representing the IoT device 515.

The IoT service 520 may generate a token which includes the device ID and client ID received from the IoT device 515. The token may also include a timestamp indicating when the token was first generated and an authorization code specifying an access or use policy to associate with the IoT device and the client ID. In addition, the IoT service 520 may encrypt the token using a key or key material known only to the IoT service 520. At 537, the IoT service 520 sends the encrypted token to the IoT device 515 over the second communication link. At 539, the IoT device 515 sends a copy of the encrypted token and the device ID to the companion app 505 over the first communication link, e.g., over the previously established BLE session.

At 541, the companion app 505 takes the encrypted token and device ID received over the first communication link from the IoT device 515 and sends them to the IoT service 520 as part of a pairing request. In addition to the encrypted token and device ID, the pairing request may also include the client ID received by the companion app 505 from the identify service 510. At 543, the IoT service validates the token in the pairing request. For example, the IoT service may obtain an encryption key corresponding to the client ID in the request from a key service and attempt to decrypt the encrypted token included in the pairing request. Provided the key successfully decrypts the token, the IoT service compares the client ID and device ID recovered from the encrypted token with the client ID and device ID included with the pairing request. Provided the IoT service 520 validates the token in the pairing request, then at 545, the IoT service binds a policy associated with the authorization code recovered from the encrypted token to the client ID and to a device shadow instantiated by the IoT service 520 to represent the physical IoT device 515. At 547, the IoT service 520 sends a pairing response message 547 to the companion app 505 indicating whether the pairing was successfully completed.

Figure 6:
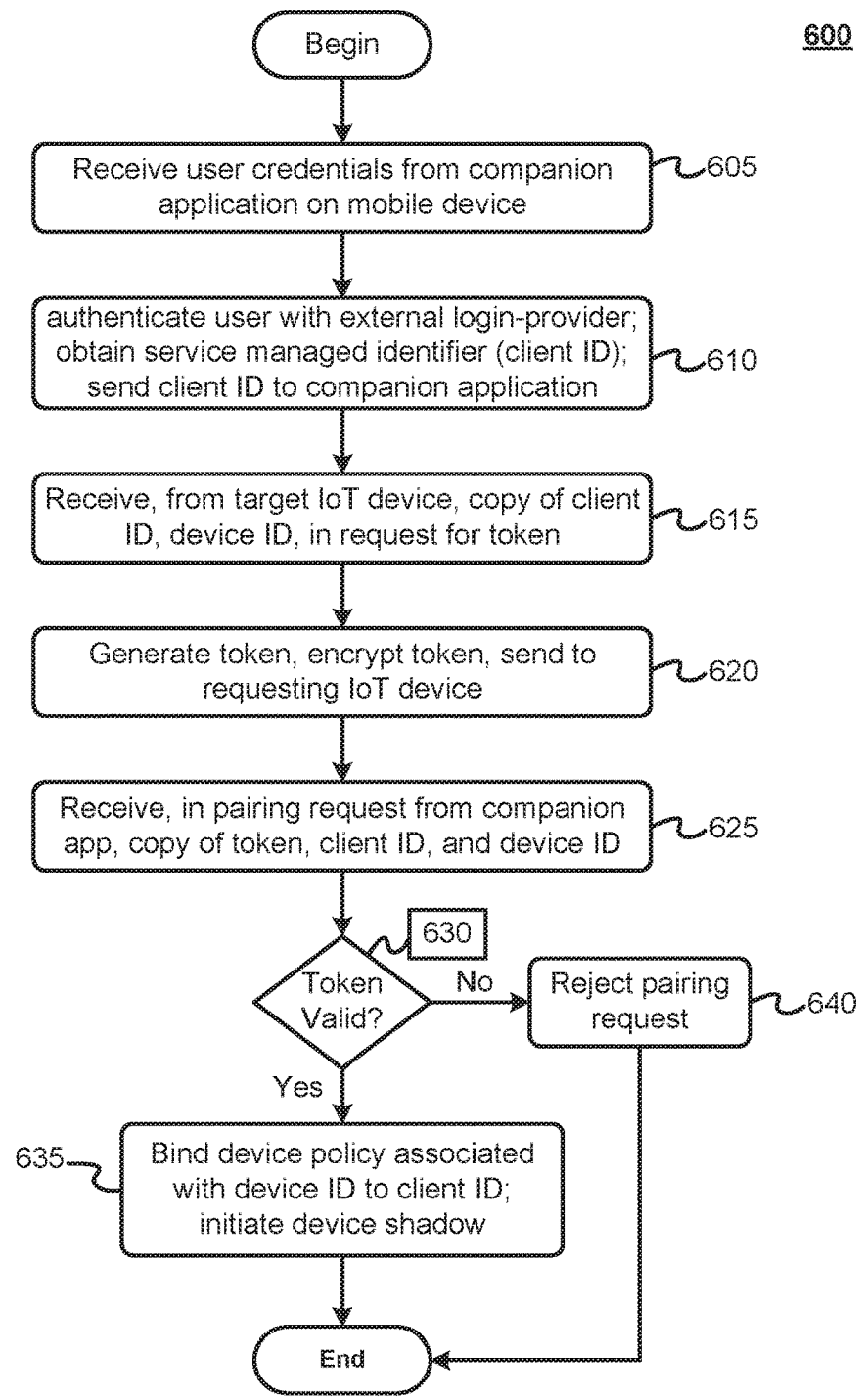
FIG. 6 illustrates a method for an IoT service to pair a companion application with an IoT device based on a service managed identity, device identity and a token issued by the IoT service, according to one embodiment.

FIG. 6 illustrates a method 600 for an IoT service to pair a service managed client identifier with an IoT device based on the user identifier, a device identity, and a token issued by the IoT service, according to one embodiment. Method 600 generally corresponds to aspects of the pairing workflow illustrated in FIG. 5, from the perspective of the IoT service. As shown, the method 600 begins at step 650 where the IoT service receives user credentials from a companion application on mobile device. As noted, e.g., the user may authenticate their identity using a username and password provided to a third-party login service to obtain an access credential. Alternatively, the IoT service could also provide a login service directly.

At step 610, the IoT service authenticates the access credential with the third-party login service. Provided the IoT service can authenticate the access credential, then IoT service obtains a service managed client identifier (client ID) used to identify that user within the IoT service domain, i.e., across a set of IoT devices associated with this particular user. The IoT service sends the client ID to the companion application. Once received, the IoT device and companion application engage in a local pairing process with one another, as discussed above. At step 615, the IoT service receives a request for a token from the IoT device participating in the pairing process. As noted, the IoT device may establish an independent connection with IoT service to use to send the token request. In addition, the token request itself may include a device ID associated with the IoT service being paired and a copy of the client ID sent first, from the IoT service to the companion app and second, from the companion application to the IoT device.

At step 620, the IoT service generates and encrypts a token to send to the target IoT device participating in the pairing process. The encryption key used to encrypt the token may be associated with the service managed client identifier, i.e., the client ID. And the token may include the client ID, device ID, a validity timestamp, and an authorization code. After being sent to the target IoT device, the target IoT device sends the encrypted token to the companion application over the local pairing communication link, e.g., over the BLE session established between the IoT device and the companion application. At step 625, the IoT service receives a pairing request from the companion application. In one embodiment, the request includes a copy of the encrypted token along with a copy of the device ID associated with the IoT device participating in the pairing process and a copy of the client ID obtained at step 610. At step 630, the IoT service validates that the token received in the pairing request at step 625 matches the token generated at step 620. As noted, to do so, the IoT service may decrypt the token using the key associated with the client ID in the request and confirm that the client ID and device ID recovered from the token match the values sent by the companion app in the pairing request. Provided the IoT service validates the token included in the pairing request, then the IoT service may complete the pairing process by associating an IoT device use and access policy associated with the device ID and IoT device with the client ID associated with the companion application and user (step 635). The IoT service may also instantiate a device shadow having a virtual state and attributes that correspond to the state and attributes of the physical IoT device participating in the pairing process. Of course, if the IoT service cannot validate token received at step 625, the pairing request is rejected (step 640).

Figure 7:
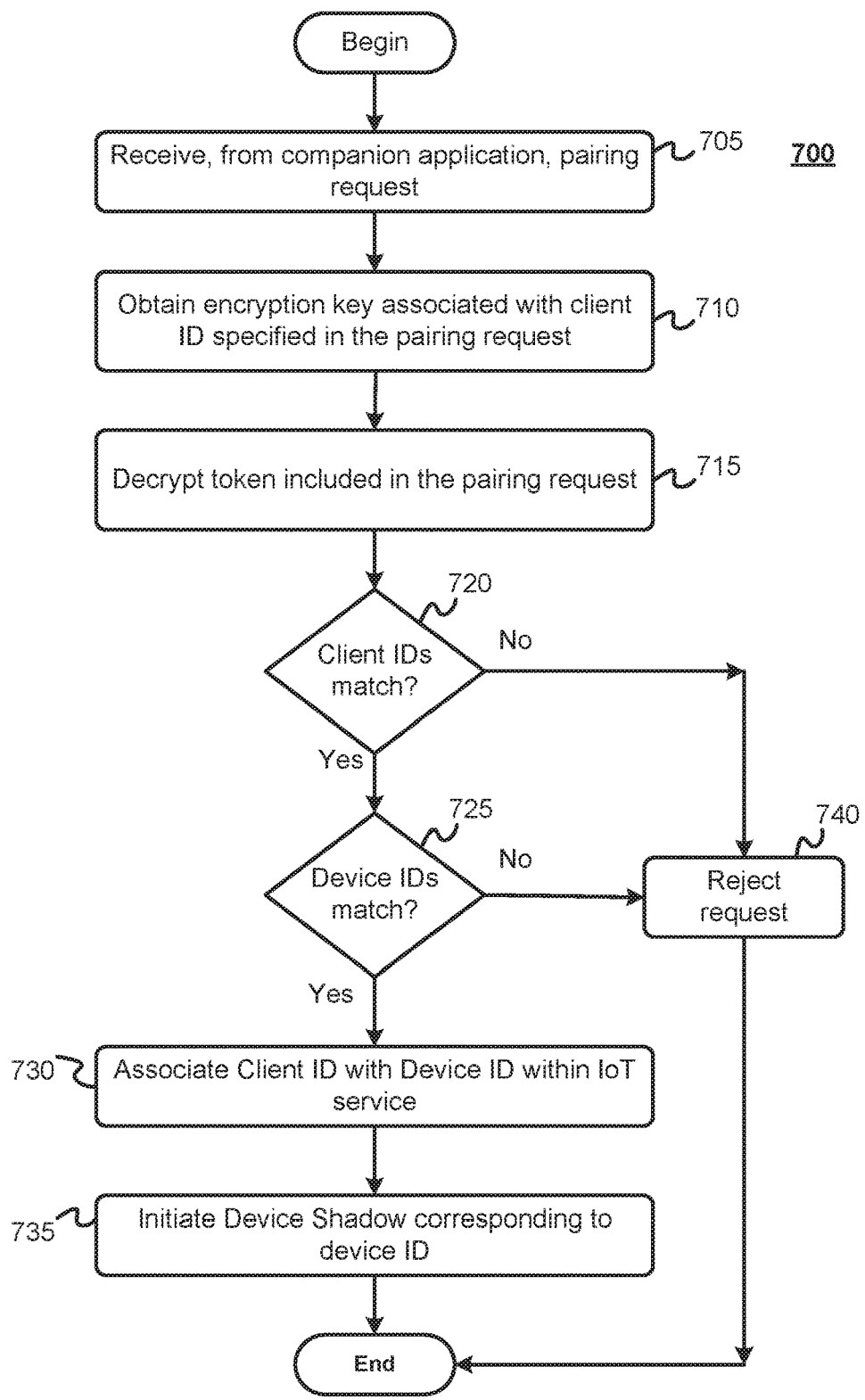
FIG. 7 illustrates a method for an IoT service to validate a paring request received from a companion application using a token issued by the IoT service to an IoT device participating in the pairing process, according to one embodiment.

FIG. 7 illustrates a method 700 for an IoT service to validate a paring request received from a companion application based on a token issued by the IoT service to an IoT device participating in the pairing process, according to one embodiment. As shown, the method 700 begins at step 705 where the IoT service receives a pairing request from a companion application. As described, the pairing request includes an encrypted token received by the companion application over a communication link with an IoT device participating in the pairing process. The request may also include a client ID and a device ID. At step 710, the pairing process obtains an encryption key associated with the client ID specified by the request. At step 715, the IoT service uses the key to decrypt the encrypted token submitted in the pairing request. The IoT service recovers a copy of the client ID and the device ID from the decrypted token.

At step 720, the IoT service compares the client ID recovered from the token with the copy of the client ID submitted with the pairing request. If the client IDs do not match, then the IoT service rejects the pairing request (step 740). Otherwise, at step 725, the IoT service compares the device ID recovered from the token with the copy of the device ID submitted with the pairing request. If the device IDs do not match, then the IoT service rejects the pairing request (step 740). Otherwise, where the device IDs and the client IDs do match, then the IoT service completes the pairing process by associating the client ID and device ID within the IOT service, e.g., by adding or updating entries in the device registry. Further, the IoT service may retrieve an authorization code from the decrypted token used to identify an access control or use policy to associate with the IoT device participating in the pairing process and the user ID. At step 735, the IoT service initializes a device shadow. For example, the IoT service may create a JSON document identifying a set of attributes and state values for the IoT device completing the pairing process. The attributes and state values may be used by the companion app and the IoT service to manage a state of the physical IoT device corresponding to the device shadow.

Figure 8:
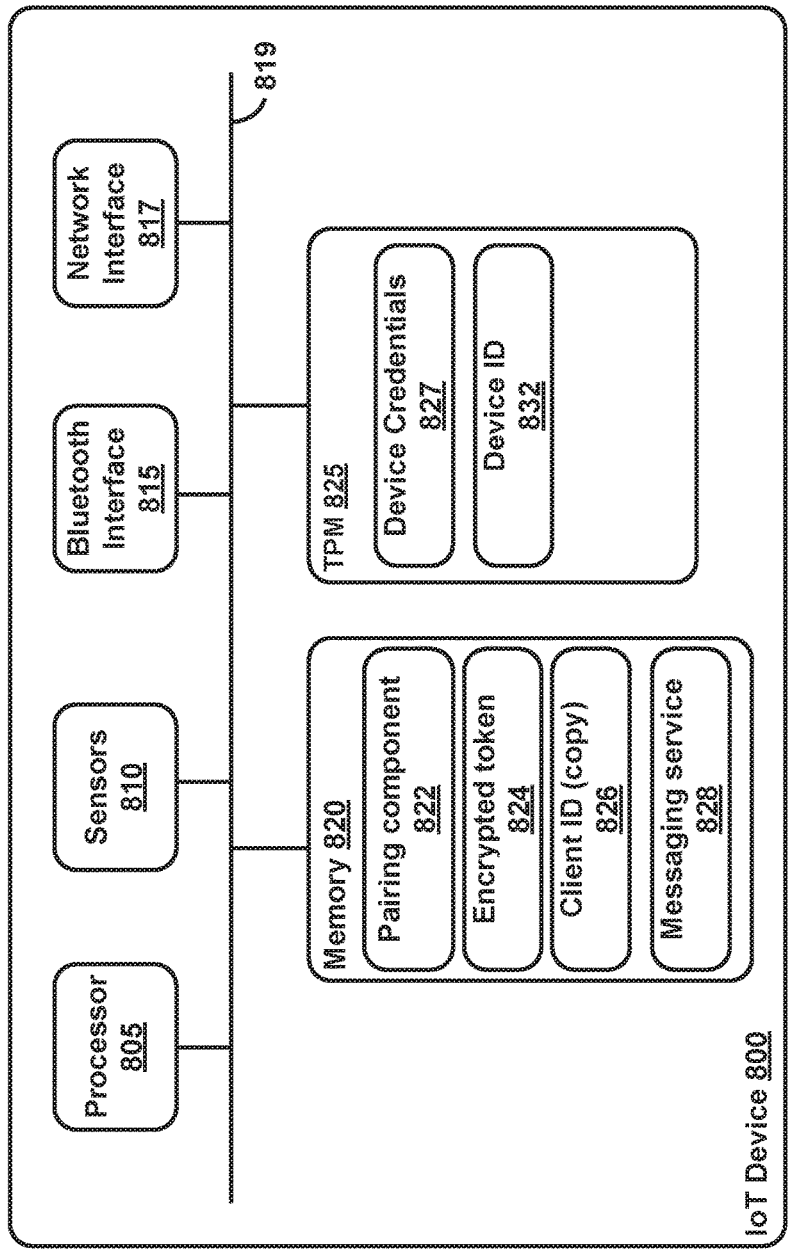
FIG. 8 illustrates a conceptual example of an IoT device, according to one embodiment.

FIG. 8 illustrates a schematic example of an IoT device 800, according to one embodiment. As shown, the IoT device 800 includes a processor 805, sensors 810, Bluetooth interface 815, network interface 817, memory 820, and trusted platform module (TPM) 825, each of which are interconnected by a bus 819. Of course, actual IoT devices could include a variety of additional or different hardware components.

The processor 805 retrieves and executes programming instructions stored in the memory 820. Similarly, the processor 805 stores and retrieves application data stored in the memory 820. The bus 819 is used to transmit instructions and data between the processor 805, sensors 810, Bluetooth interface 815, network interface 815, and the memory 820 as needed. The processor 805 is included to be representative of a single CPU, multiple CPUs, a single CPU having multiple processing cores, as well as an FPGA or dedicated ASIC processing hardware.

Illustratively, the memory 820 includes a pairing component 822, an encrypted token 824, a copy of a client identifier 826, and a messaging service 828. In one embodiment, application components on the IoT device 800 generally control, read, or otherwise interact with sensors 810 and other components of the IoT device 800 to perform the intended functions of the IoT device 800. For example, for an IoT enabled thermostat, the application components could read the ambient temperature observed by sensors 810, store this information in memory 829, control or adjust settings of HVAC systems, etc. In other cases, an IoT device 800 may manage state information without the need for sensors 810. For example, for an IoT enabled light bulb or power switch, application components on the IoT device 800 could maintain and update a state of the IoT device as being powered on or powered off.

The messaging service 828 generates, formats, and sends messages to other IoT devices or services endpoints. The messaging service 824 may support a variety of communication protocols, such as MQTT, to send messages using a publish/subscribe model. For example, for the IoT enabled thermostat, messaging service 824 could respond to messages from a companion application specifying a desired temperature or report the current ambient temperature to the IoT service. In turn, the rules engine at the IoT service could invoke a rule that writes the temperature to a cloud-based storage service.

The pairing component 822 is used to establish a local communication session with a companion application running on a mobile device as part of the three-way pairing process described above. As described, e.g., the pairing component 822 may be used to establish a Bluetooth low energy (BLE) session with the companion application on the mobile device. The encrypted token 824 provides a token received from the IoT service as part of the pairing process. In one embodiment, the IoT device receives the encrypted token 824 in response to a request sent the IoT service for the token, where the request includes a device ID 832 and a client ID 826. As described, the client ID 826 may be received by the pairing component 822 from the companion application as part of the pairing workflow. The device ID 832 may provide a unique identifier assigned by the manufacture of IoT device 800, e.g., a MAC address or UUID value.

As shown, the TPM 825 includes device credentials 826 and the device ID 832. The TPM 825 generally includes a secure cryptographic processor and tamper proof storage module that integrates the device credentials 826 into the IoT device 800. Typically, a private key (of a public/private keypair) is embedded in tamper-proof storage of the TPM 325. Device credentials 326 may include the keypair as well as the device ID 832, such as a hardware device identifier, MAC address, and the like.

Figure 9:
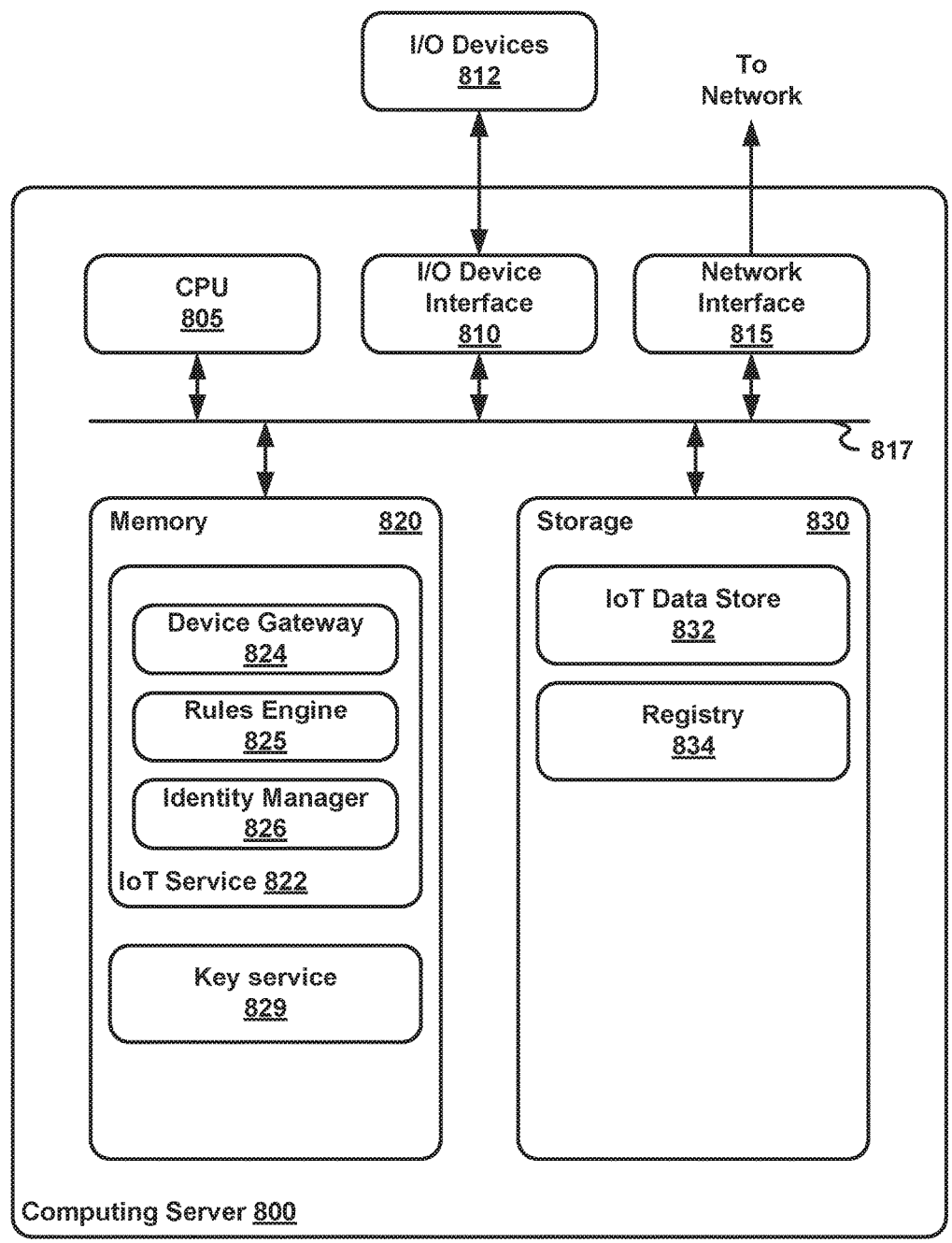
FIG. 9 illustrates an example computing server hosting an IoT service used to pair an IoT device with a companion application on a mobile device using a three-way handshake, according to one embodiment.

FIG. 9 illustrates an example computing server hosting an IoT service used to pair an IoT device with a companion application on a mobile device using a three-way handshake, according to one embodiment.

As shown, the computing server 900 includes a central processing unit (CPU) 905, a network interface 915, a memory 920, and storage 930, each connected to an interconnect bus 917. The computing server 900 also includes an I/O device interface 910 connecting I/O devices 912 to the computing server 900.

In context of this disclosure, the components of computing server 900 are included to be representative of physical computing systems (e.g., a system in a data center) as well as components of a virtual machine (VM) instance executing within a computing cloud. Further, a cloud computing service provider could offer components of the IoT services accessed using a network browser or dedicated console application (e.g., console applications to configure IoT devices for use on the cloud computing service provider). Further still, while shown as running on a single computing server 900, components in memory 920 and storage 930 may be deployed across multiple computing servers.

CPU 905 retrieves programming instructions and application data stored in the memory 920 and storage 930. The bus 917 transmits programming instructions and application data between the CPU 905, I/O device interface 910, network interface 915, memory 920, and storage 930 as needed. CPU 905 is included to be representative of a single CPU, multiple CPUs, a single CPU having multiple processing cores, and the like, and the memory 920 is generally included to be representative of a random access memory. The storage 930 may be a disk drive or flash storage device. Although shown as a single unit, the storage 930 may be a combination of fixed and/or removable storage devices, such as fixed disc drives, removable memory cards, optical storage, network attached storage (NAS), or a storage area-network (SAN).

Illustratively, the memory 920 includes an IoT service 922, and the IoT service 922 includes a device gateway 924, rules engine 925, and an identity manager 926. As described, the IoT service 922 is generally configured to allow connected IoT devices to interact with services provided by a cloud computing platform. For example, the device gateway 924 allows IoT devices to communicate with other connected devices and cloud services using a publish-subscribe-based message broker service. And the rules engine 925 evaluates inbound messages published to the IoT service 922 sent by the IoT devices against predefined rules. Further, the device gateway 924 may receive messages sent by the companion application and an enrolling IoT device as part of the pairing process described above. The memory 920 also includes a key service 929. The key service 929 generally provides a software component used to generate and manage a pairing encryption key for users of the IoT service. That is, the key service 929 manages a pairing encryption key corresponding to each service managed client identifier (client ID).

In one embodiment, the identity manager 826 generates a service managed user identifier (client ID) to represent a given user across a collection of paired IoT devices. During the pairing process, the client ID identifier is sent to a companion application after authenticating a user of the companion application. Subsequently, the application forwards the client ID to the IoT device participating in the pairing process, which forwards the client ID back to the device gateway 924 as part of a token request. After generating a token and completing the three-way pairing workflow, the IoT service creates a device shadow for the just-paired IoT device and stores the device shadow in the IoT data store 932.

Once the IoT device is paired with the IoT service 922 and companion application, the identity manager 926 may register the IoT device with the registry 934, which provides information regarding IoT devices associated with a given user account. That is, the registry 934 may store information reflecting the pairing between a given client ID, companion application, and IoT device.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-readable storage medium storing instructions, which, when executed on a computing system, cause the computing system to perform an operation for pairing an Internet-of-Things (IoT) device and a companion application using a three-way handshake, the operation comprising:
   receiving, from a companion application executing on a user device separate from the computing system and the IoT device, a request to pair the IoT device, wherein the request includes authentication credentials associated with a given user;
   obtaining a client identifier (client ID) associated with the given user based at least in part on the authentication credentials;
   sending the client ID to the companion application, wherein the companion application establishes a pairing session with the IoT device and wherein the companion application sends the client ID to the IoT device over the pairing session;
   receiving, from the IoT device, a request for a token, wherein the request for the token includes at least the client ID and a device identifier (device ID) corresponding to the IoT device;
   generating the requested token, wherein the token includes at least the client ID, the device ID, a timestamp, and an authentication code;
   encrypting the token;
   transmitting the encrypted token to the IoT device, wherein the IoT device sends the encrypted token and the device ID to the companion application over the pairing session;
   receiving, from the companion application, a pairing request, wherein the pairing request includes the encrypted token received by the companion application, the device ID, and the client ID; and
   upon determining the encrypted token received from the companion application matches the encrypted token sent to the IoT device, associating an access policy with the client ID and the IoT device.

2. The computer-readable storage medium of claim 1, wherein the operation further comprises, instantiating a device shadow corresponding to the IoT device, wherein the device shadow specifies a set of one or more attributes corresponding to the IoT device and wherein the one or more attributes are set to reflect a last known state of the IoT device.

3. The computer-readable storage medium of claim 1, wherein the pairing session comprises a Bluetooth low energy communication session between the IoT device and the user device executing the companion application.

4. The computer-readable storage medium of claim 1, wherein the authentication credentials are obtained from a third-party login service.

5. The computer-readable storage medium of claim 1, wherein determining the encrypted token received from the companion application matches the encrypted token sent to the IoT device comprises:
   decrypting the encrypted token included in the pairing request;
   recovering, from the decrypted token, the device ID and the client ID; and
   verifying that the device ID and the client ID recovered from the decrypted token matches the device ID and client ID received in the pairing request.

6. A system, comprising:
   a memory storing instructions, which, when executed on the system, performs an operation for pairing an Internet-of-Things (IoT) device with an application, the operation comprising:
      sending the application, over a first communication link established between the application and an IoT service, a service managed client identifier (client ID), wherein the application is executed on a user device separate from the system and the IoT device,
      receiving from the IoT device, over a second communication link, a request for a token, wherein the request includes the client ID and a device identifier (device ID) associated with the IoT device, wherein the second communication link is established between the IoT device and the IoT service,
      sending, over the second communication link, an encrypted token to the IoT device,
      receiving from the application, over the first communication link, a pairing request, wherein the pairing request includes a copy of the encrypted token, the device ID, and the client ID, and
      upon validating the pairing request, pairing the client ID and the IoT device by associating the client ID and the device ID.

7. The system of claim 6, wherein the encrypted token stores a copy of the client ID and a copy of the device ID.

8. The system of claim 6, wherein the application establishes a third communication link, wherein the third communication link is established between the application and the IoT device.

9. The system of claim 8, wherein the third communication link comprises a Bluetooth low energy communication session between the IoT device and the user device executing the application.

10. The system of claim 6, wherein the operation further comprises, receiving, over the first communication link, authentication credentials associated with a user.

11. The system of claim 10, wherein the authentication credentials are obtained from a third-party login service.

12. The system of claim 6, wherein validating the pairing request comprises:

decrypting the encrypted token included in the pairing request;

recovering, from the decrypted token, the device ID and the client ID; and verifying that the copy of the device ID and the copy of the client ID recovered from the decrypted token matches the device ID and client ID received in the pairing request.

13. The system of claim 6, wherein the operation further comprises, upon validating the pairing request, instantiating a device shadow corresponding to the IoT device, wherein the device shadow specifies a set of one or more attributes corresponding to the IoT device and wherein the one or more attributes are set to reflect a last known state of the IoT device.

14. The system of claim 6, wherein the operation further comprises:

upon validating the pairing request, identifying an access control policy based at least on an authorization code recovered from the token, and associating the access control policy with the client ID and the device ID.

15. The system of claim 6, wherein the first and second communication links are encrypted using transport layer security (TLS) or session layer security (SSL).

16. A computer implemented method for pairing an Internet-of-things (IoT) device with an application, the method comprising:

sending the application a service managed client identifier (client ID) associated with a user of the application by an IoT service, wherein the client ID is sent over a first communication link established between the application and the IoT service, and wherein the application is executed on a user device separate from the IoT service and the IoT device;

receiving from the IoT device, over a second communication link, a request for a token, wherein the request includes the client ID and a device identifier (device ID) associated with the IoT device, wherein the second communication link is established between the IoT device and the IoT service;

sending, over the second communication link, an encrypted token to the IoT device, wherein the encrypted token stores the client ID and the device ID;

receiving from the application, over the first communication link, a pairing request, wherein the pairing request includes a copy of the encrypted token, the device ID, and the client ID; and validating the pairing request by decrypting the encrypted token included in the pairing request and verifying that the device ID and the client ID recovered from the decrypted token matches the device ID and client ID received in the pairing request.

17. The method of claim 16, further comprising, upon validation of the pairing request, associating an access policy with the client ID and the device ID.

18. The method of claim 16, wherein the application establishes a third communication link, wherein the third communication link is established between the application and the IoT device.

19. The method of claim 18, wherein the third communication link comprises a Bluetooth low energy communication session between the IoT device and the user device executing the application.

20. The method of claim 16, further comprising, upon validation of the pairing request, instantiating a device shadow corresponding to the IoT device, wherein the device shadow specifies a set of one or more attributes corresponding to the IoT device and wherein the one or more attributes are set to reflect a last known state of the IoT device.

* * * * *